United States Patent [19]

Crum et al.

[11] 4,455,509

[45] Jun. 19, 1984

[54] INTRINSICALLY SAFE LIGHTING SYSTEM

[76] Inventors: Stephen T. Crum, 1598 Highland Park, Barboursville, W. Va. 25504; Lyle T. Keister, 1572 Campbell Dr., Huntington, W. Va. 25705

[21] Appl. No.: 494,620

[22] Filed: May 16, 1983

[51] Int. Cl.³ .......................................... H05B 41/29
[52] U.S. Cl. .................................. 315/119; 315/127; 315/225; 361/93; 361/111; 363/56
[58] Field of Search ............... 315/119, 121, 122, 127, 315/224, 225; 328/7; 307/157, 326; 331/62, 63; 361/5, 57, 63, 93, 111; 363/55, 56

[56] References Cited

U.S. PATENT DOCUMENTS

| | | | |
|---|---|---|---|
| 3,648,110 | 3/1972 | Knight | 361/111 |
| 3,869,648 | 3/1975 | Zendle et al. | 361/111 |
| 3,955,132 | 5/1976 | Greenwood | 320/43 X |
| 4,135,223 | 1/1979 | Holmes | 361/56 |
| 4,195,325 | 3/1980 | Richardson et al. | 361/56 |
| 4,210,846 | 7/1980 | Capewell et al. | 315/122 X |
| 4,213,164 | 7/1980 | Gaertner | 361/56 |
| 4,264,950 | 4/1981 | Bockhorst et al. | 363/56 X |

*Primary Examiner*—Eugene R. LaRoche

[57] ABSTRACT

An intrinsically safe lighting system for energizing fluorescent lamps and the like in potentially flammable or explosive atmospheres is disclosed wherein one or more intrinsically safe power supply modules embody current monitoring and diverter circuitry, operable, upon the occurrence of abnormal circuit conditions such as a short or open circuit, to interrupt the lamp power supply and divert energy therefrom so rapidly that non-intrinsically safe sparking and ignition of the flammable atmosphere is avoided.

5 Claims, 4 Drawing Figures

INTRINSICALLY SAFE LIGHTING SYSTEM

This invention relates generally to electrical control and supply systems and more particularly to intrinsically safe electrical systems for use in explosive or potentially explosive atmospheric conditions.

Transmission of electrical energy in locations where the atmosphere may be flammable or explosive due to the presence of gases, vapors or dust which are combustible with the oxygen in the air, is a recognized and serious industrial hazard. In such instances, it is vitally important to prevent ignition of the explosive atmosphere by the elimination of naked flames and the avoidance of incendive sparks or hot surfaces.

While the use of electrical energy in such hazardous locations poses special problems, appropriate techniques have been developed heretofore for electrical equipment designed to operate safely in explosive atmospheres. Among such prior known developments are the use of explosion-proof enclosures for the electrical equipment and intrinsically safe electrical circuits in which the energy level is maintained below the minimum required to ignite the most flammable gas, vapor or dust found in the prescribed location. Such techniques and others are well documented and subject to national and international standards. Among prior patents pertinent to these developments are: U.S. Pat. Nos. 3,309,542; 3,445,679; 3,801,865; 4,186,432; and United Kingdom Patents 1,365,922; 1,366,134; 1,401,628 and 2,061,034.

The utilization of electrical power supplies in underground coal mines, for example, where the presence of methane gas can create a flammable atmosphere, presents special problems particularly in the area of illumination and lighting power supplies. Pertinent laws and standards specify both minimum acceptable levels of illumination and safety requirements for electric lighting used in specified working areas of underground coal mines. The maximum amount of glare which is acceptable from an approved luminaire also is specified and regulated.

Those requirements are met best by the utilization of fluorescent lamps, but this type of lamp inherently requires voltage and current levels which, taken in combination, are higher than those generally associated with intrinsically safe circuits. Nevertheless, intrinsically safe fluorescent lamp circuits and power supplies have been used in coal mines for several years. The basic principles used in such prior developments to achieve intrinsic safety and satisfactory fluorescent lamp operation have centered largely about the use of high frequency (30–100 kHz) power supplies and resonant circuits which develop high enough voltage on open circuit to permit initial striking or energization of the fluorescent lamps, while exhibiting sufficiently high impedance under normal running conditions to insure that currents and voltages in related parts of the circuit exposed to the flammable atmosphere are within prescribed intrinsically safe limits.

Utilization of a high frequency power supply in such systems is desirably advantageous because values of reactive circuit components are inversely proportional to frequency. Hence, energy stored in those components which might feed an accidental spark is correspondingly reduced at higher frequencies.

SUMMARY OF THE PRESENT INVENTION

In brief, the present invention is directed to an improved, operably reliable, intrinsically safe power supply and control system for energizing fluorescent lamps in potentially flammable or explosive atmospheres, such as occur in underground mines; the system employing a high frequency power supply coupled to the fluorescent lamps via control circuit means embodying current monitoring means responsive to the flow of current in the lamp supply circuit and employing optical means for coupling the current monitoring means to current diverter means. The current diverter means is operable in the presence of abnormal circuit conditions, detected by the monitoring means, to quickly divert power from the lamp supply circuit and de-energize current interrupt relay means, having time delay means whereby power to the fluorescent lamp is alternately turned "on" and then "off" for a predetermined time interval until the causitive abnormal condition is abated. A fundamental concept incorporated in the supply and control circuit means of this invention resides in the provision of current monitor and diverter means capable of interacting so rapidly that energy released to a spark, as by a circuit fault or the like, is so limited in time that the spark's duration is insufficient to create a non-intrinsically safe condition.

It is an important object of this invention to provide an improved intrinsically safe electrical lighting system useful in potentially explosive atmospheric conditions.

It is another important object of this invention to provide an improved intrinsically safe electrical system, as aforesaid, which embodies current monitoring means and diverting means capable of interacting so quickly that the duration of any sparking is maintained at intrinsically safe levels.

Another important object of this invention is to provide an improved intrinsically safe system for illuminating fluorescent lamps in an underground mine or like potentially explosive atmosphere which is operable to divert energy from an accidental spark or any component which might otherwise overheat in such a sensitive and rapid manner that ignition of the explosive atmosphere is avoided.

Still another object of this invention is to provide an improved intrinsically safe lighting system for use in explosive atmospheric conditions which employs a high frequency power supply, electronic componentry and circuits arranged to limit the duration of any electrical spark by diverting and cutting off electrical energy therefrom so rapidly that intrinsically safe operational conditions are maintained.

The above and further objects, features and advantages of this invention will appear from time to time from the following detailed description of a preferred embodiment thereof illustrated in the accompanying drawings and representing the best mode presently contemplated to enable those of skill in this art to practice this invention.

IN THE DRAWINGS

DESCRIPTION OF THE PREFERRED EMBODIMENT

Figure 1:
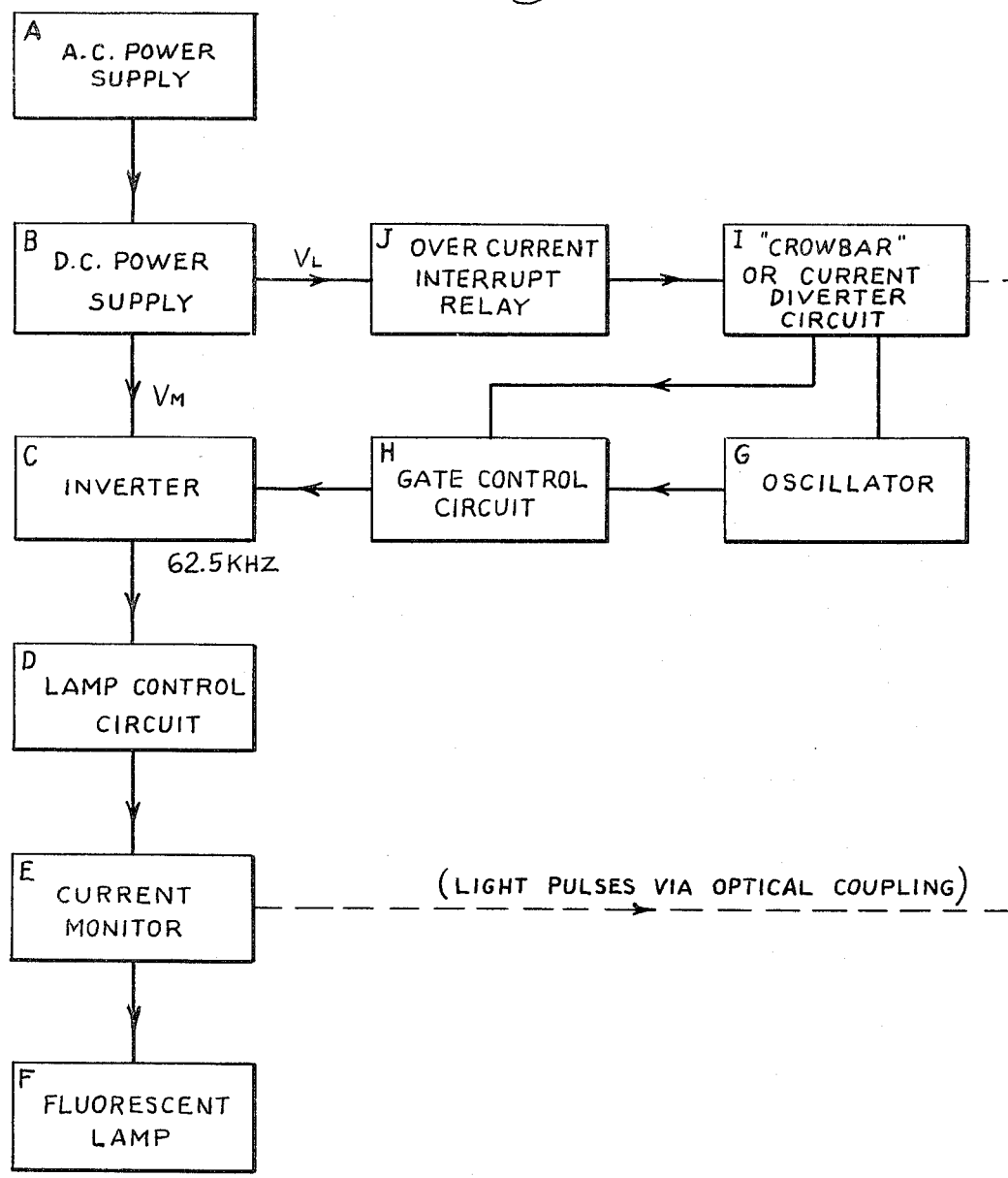
FIG. 1 is a schematic block diagram of an intrinsically safe fluorescent lighting system in accordance with this invention.

Turning now to the preferred embodiment of this invention illustrative of its concepts and teachings, initial reference is made to the block diagram of FIG. 1 setting forth the general features of the overall system.

As there shown, a conventional AC power supply module (block A) powered from a single- or three-phase source, produces a nominal 120 volt 50/60 Hz output which is fed to a DC power supply module (block B) productive of two separate DC outputs, namely, a nominal low voltage output in the order of 24 volts and a high voltage output in the order of 170 volts.

The high voltage output of the DC power supply module "B" is fed to a DC to AC inverter (block C) productive of an output signal having a typical frequency of approximately 62.5 kHz which is inductively coupled to a lamp control circuit (block D) incorporating lamp operating ballast, resonant and heater circuits for operating a fluorescent lamp.

The lamp control circuit "D" directly feeds a current monitor (block E) through which the lamp current flows via a chain of resistors arranged so that if the peak voltage drop across any one of the resistors exceeds a predetermined threshold voltage (approximately six volts) an optical coupling means, which joins the monitor "E" with an overcurrent diverter circuit (block I), is instantaneously activated to shut down the system. In normal operation, current flow through the monitor "E" energizes the fluorescent lamp of block F comprising a standard low wattage commercial fluorescent lamp which is connected to the system over a three-conductor cable, preferably having low capacitance characteristics.

Block G is a conventional oscillator productive of a prescribed signal of rectangular wave form, preferably at a frequency of approximately 62.5 kHz, which is used to operate gate control circuit means (block H) for controlling field effect power transistors associated with the DC-AC inverter (block C).

Block J is an overcurrent trip reset relay circuit which is powered by the low voltage DC output of the DC power supply "B" and controls the power supply to the diverter circuit of block I which in turn supplies low voltage power to the oscillator circuit "G" and the gate control circuit "H". The relay circuit is electronically controlled and employs a single contact, normally open, reed type relay having operating/release times in the order of 1 to 2 milliseconds. Importantly, due to associated capacitors, when the relay circuit is switched on there is a time delay of approximately 1½ seconds before the relay operates to close its contacts. Operation of the relay closes a single set of relay contacts and completes supply circuits to blocks G and H via current diverter "I", enabling oscillator "G" and gate control circuit "H" to switch on the inverter "C" to provide high frequency power to the lamp control circuit "D".

Importantly, the diverter circuit "I" includes one or more silicon-controlled rectifiers (SCRs) which are optically coupled to light emitting diodes of the current monitor "E" such that a single pulse of light of even extremely short duration is sufficient to turn on the SCRs in the diverter circuit "I". This results in effectively grounding the power supply to the oscillator "G" and gate control circuit "H" causing the inverter "C" to immediately shut off due to the absence of gate pulses to its field effect transistors. This shut down condition comes into play in response to the activity of the current monitor "E" in the presence of abnormal circuit conditions.

Such operation of the SCRs also grounds the power supply to the relay circuit "J" causing the relay contacts to open and thereby shut down the diverter means and deenergize the SCRs. Thereafter, the relay contacts alternately close and open until the circuit abnormality detected by the monitoring means is abated. Importantly, the closed relay contact periods are of short duration during such cyclic operation so that the power "on" condition of the lamp control circuit is too brief to violate intrinsic safety conditions by excessive heating so long as the detected abnormality obtains.

The AC power supply "A" has sufficient capacity to serve a complete lighting installation. A single DC supply module, B, is designed to serve up to nine intrinsically safe lighting modules, each of which comprises the block sections C, D, E, G, H, I and J, preferably arranged in modular form and stored in a protective housing. Each lighting module operates a single fluorescent lamp.

Having described the general features of the improved lighting system according to this invention, a more detailed description of important particulars and operation thereof will now be set forth.

Figure 2:
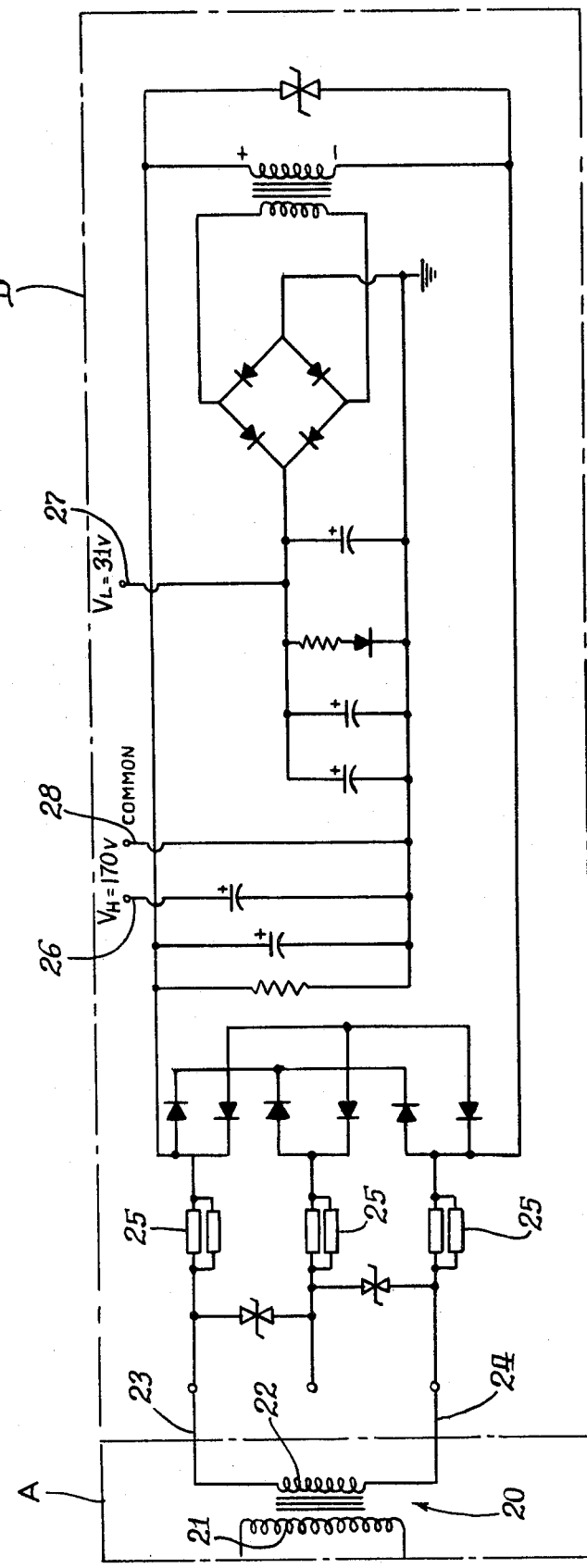
FIG. 2 is a circuit diagram of typical AC and DC power supply modules utilized in the system illustrated in FIG. 1.

Features of the AC power supply "A" and DC power supply "B" are generally set out in FIG. 2 of the drawings from which it will be recognized that the AC power supply comprises a conventional main supply power transformer 20 having a nominal output rating of 120 volts, 50/60 Hz, the primary 21 of which is supplied either from a single- or three-phase power source in a conventional manner. This transformer preferably is isolated from the ground and located in fresh air or in an explosion-proof enclosure.

The secondary winding 22 of transformer 20 is coupled via output conductors 23 and 24 to the DC power supply "B" over line fuses 25. The DC supply "B" is conventional, preferably is designed as a printed circuit board, and provides high and low DC voltage outputs over conductors 26 and 27, respectively, having a common ground 28. Power supply "B" is capable of powering at least one, but not more than nine lighting modules, as noted heretofore, and normally is located in either fresh air or housed in an explosion-proof enclosure like the AC supply "A". Commonly, the preferred low and high voltage outputs of DC module "B", for a 120 volt three-phase input from module "A", are in the order of 24 volts and 170 volts DC. As noted heretofore, the high voltage is supplied to the inverter section "C" over output conductor 26 while the low voltage is fed to the current interrupt relay section "J" over output conductor 27; conductor 28 providing a common ground therefor.

Figures 3, 3A:
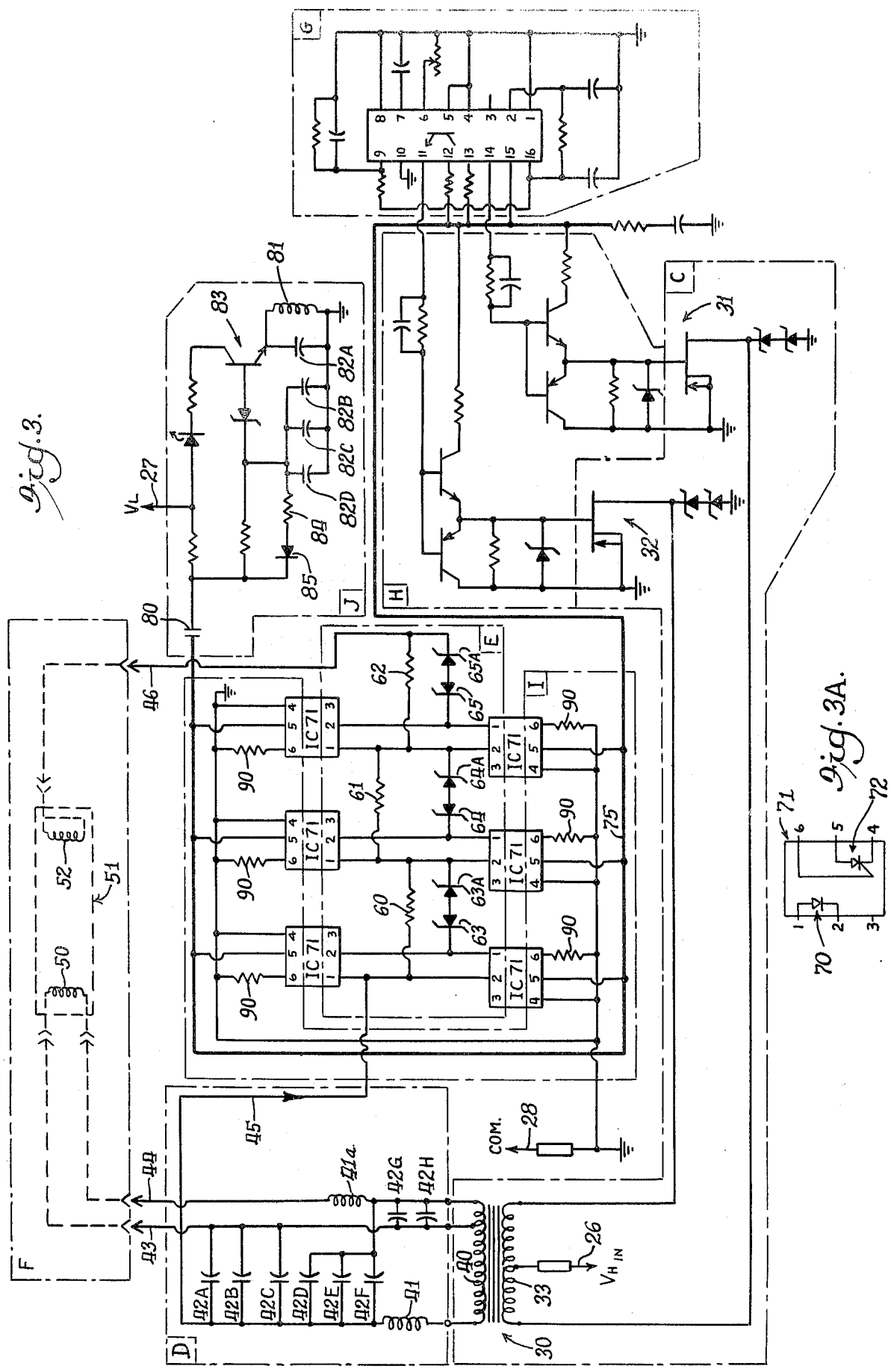
FIG. 3 is a schematic diagram of the modular circuitry employed with the power supply modules of FIG. 2 in accordance with the system configuration illustrated in FIG. 1.
FIG. 3A is a detailed schematic of an integrated circuit component shown in FIG. 3.

With reference to FIG. 3 of the drawings, the various electronic circuits associated with the intrinsically safe lighting module, comprising the several sections "C", "D", "E", "F", "G", "H", "I" and "J", are schematically illustrated.

It will be recalled that the high voltage output of the DC power supply "B" is coupled directly by conductor 26 to the DC to AC inverter section "C" which comprises a power transformer 30 in circuit with a pair of field effect power transistors 31 and 32. These transistors are alternately conductive in response to operation of the gate control circuit "H" fed by oscillator "G". As shown, primary winding 33 of the transformer 30 has a center tap winding connected to the high voltage input conductor 26 from DC power supply "B". One end of the primary winding is connected to the drain of the field effect transistor 31 and the opposite end thereof is connected to the drain of the other transistor 32. With this arrangement, the primary winding 33 of the transformer is alternately energized in accordance with the alternating conduction of the two field effect power transistors 31 and 32. Thus, the input DC power is converted to an effective high frequency AC (62.5 kHz) for powering the lamp control section "D".

As previously noted, the alternating energization of the two field effect transistors 31 and 32 is controlled by operation of a conventional oscillator section "G" and gate control circuit "H", both of which are powered by low voltage DC via the overcurrent trip reset relay circuit "J" and the current diverter circuit "I" for reasons which will appear in greater detail hereinafter.

Considering the lamp control circuit "D", it will be understood that the same is powered inductively through the secondary winding 40 of the transformer 30. This circuit comprises an inductor 41 in circuit with one end of the secondary winding 40 to act as a ballast for stabilizing lamp current under running conditions. Inductor 41 forms a series resonant circuit with a plurality of capacitors, group 42A-C connected between conductors 43, 45 and a second group 42D-F across conductors 44, 45 leading from the secondary winding 40 of the transformer 30. Conductors 43 and 44 are in circuit with an intermediate tapping and one terminal end of transformer winding 40, respectively, to provide approximately 5% of the total winding voltage to heat filament 50 at one end of the fluorescent lamp 51; the other filament 52 thereof being heated by ionic bombardment (see section F).

A third group of capacitors 42G, 42H is connected across the heater circuit conductor 43, 44 and a second inductor winding 41a, the latter limiting current flow between conductors 43 and 44 in the event of a short therebetween.

The supply circuit to the lamp 51 is completed over conductor 45, joining the lamp control circuit D with the current monitoring circuit "E", and a lamp supply conductor 46 connected to the lamp filament 52. With this arrangement, lamp current normally flows through conductor 45 over a chain of three resistors 60, 61 and 62 to the lamp supply conductor 46 and filament 52.

The current monitor circuit "E" is arranged so that if the peak voltage drop across any one of the resistors 60–62 thereof exceeds a prescribed threshold voltage (approximately six volts) as determined by the characteristic of associated pairs of back-to-back zener diodes 63, 63A, 64, 64A and 65, 65A, a photodiode 70 of any one of the six sections A–D of IC71 in the current diverter circuit "I" conducts and emits light. Details of the IC sections 71A–D are illustrated in FIG. 3A.

The pairs of zener diodes are arranged to effectively monitor the plus and minus peaks of the high frequency lamp current flowing through resistors 60–62. Any transient "spikes" or violations of designed peak limits of the prescribed sinusoidal wave pattern renders the photo diodes conductive. Thus, the zener diodes effectively monitor the current flow in this intrinsically safe circuit arrangement.

In this respect, it is to be noted that the several capacitors 42A–H in the lamp supply circuit also act to "trigger" the monitoring means. Specifically, capacitors 42A, B and C supply short, high-energy "peak" or "spike" current pulses to monitoring means "E" in the event of a short between conductors 43 and 46; capacitors 42D, E, and F likewise respond in the event of a short between conductors 44 and 46 and the two capacitors 42G and H produce a like response in the event of a short between conductors 43 and 44. Therefore, in addition to their normal resonant circuit function in the lamp supply circuit, the several capacitors 42A–H uniquely provide a secondary safety function by triggering the monitoring circuit under the above described "short circuit" conditions.

Upon light emissions from a photo diode 70, an associated light responsive silicon controlled rectifier (SCR) 72 is optically turned on, with the reaction thereof being sufficiently sensitive that a single pulse of light of even extremely short duration is sufficient to render the SCR conductive. When a SCR 72 conducts the circuit connected to its anode pin 5 is grounded over pin 4 which is in circuit with the common ground supply conductor 28.

It will be noted that pin 5 of each of the SCR sections 72 is in circuit with conductor 75 which connects the low voltage supply from conductor 27 (supplying low voltage power to the overcurrent trip reset relay section "J") to the current diverter section "I", the gate control circuit "H" and the oscillator "G". Thus, when a SCR 72 of IC71 conducts in response to the light emission from an associated photo diode 70, the circuit sections "G", "H", "I" and "J" are all effectively grounded and shut down. More specifically, when the power supply to circuit sections "G" and "H" is removed, the inverter "C" is immediately shut down due to the absence of gate pulses to its field effect transistors 31 and 32. This turns off the high frequency output to the lamp control circuit "D".

Grounding of conductor 75 by operation of the described diode light pulse and optically coupled SCR also effectively shuts down the overcurrent trip reset relay circuit "J" which comprises a single reed relay having normally open, quickly responding, relay contacts 80 and an operating relay coil 81 in circuit with capacitors 82A–D and transistor 83. When the low voltage supply is grounded, the capacitors 82A–D discharge over resistor 84, diode 85 and the grounded conductor 75. The transistor 83 therefore turns "off" because the base voltage thereon is reduced below an operating level. This removes the power supply from the relay coil 81, causing relay contacts 80 to open with operate/release times in the range of 1 to 2 milliseconds. After a time delay of approximately one and one-half seconds, the capacitors 82A–D are recharged from supply conductor 27 and the relay contacts 80 again close. This operation repeats so long as the initiating fault or abnormal circuit condition detected by monitor "E" obtains. It is to be noted that the relative "open" and "closed" times of the relay contacts prevent over heating of circuit components.

Since the relay circuit is directly coupled to the low voltage supply conductor 27 and by means of conductor 75 to sections "G", "H" and "I", as noted, upon closing operation of the relay contacts 80, the low voltage supply circuit to sections "G" and "H" via section "I" is reestablished. This enables the oscillator circuit "G" and the gate control circuit "H", which are of conventional design, to drive the inverter "C". However, if the circuit abnormality still obtains, the short "on" time of the inverter "C" is too brief to over heat circuit components, and merely serves to re-trigger the monitor.

The overcurrent trip reset relay circuit "J" importantly serves two separate basic purposes in the circuit organization according to this invention.

Initially, once switched to a conducting state, the SCRs 72 remain conductive even with very small through currents. Thus, it is necessary to completely interrupt the supply circuit to switch them off and reset the monitoring means. This is brought about by the open contact operation of relay contacts 80 as above noted.

Secondly, it is possible for sustained arcing or other resistive heating to create localized heating to a degree capable of igniting gases even though the current may be within the limits of intrinsic safety. In the circuit described, this problem is avoided by the highly sensitive interaction between the current monitor and diverter circuits and the overcurrent trip reset relay. Because of the reactive nature of the lamp control circuit and interconnecting cable, any sudden change in circuit parameters, such as the occurence of a short or open circuit, results in energy discharge and associated transient currents which immediately trigger the protective diverter circuit "I" cutting off the inverter "C". The time delay characteristics of overcurrent trip reset relay circuit "J" delays re-start of the inverter, as noted, (repeatedly until the circuit abnormality is cured) in which case the circuit is never turned on long enough for undesired high temperatures to develop.

Of added importance, while it is well recognized that many intrinsically safe electrical systems involve open sparking in normal use, that is not the case with the lighting system of this invention. The described electronic "cut off" system is so sensitive and fast that it responds to current spikes which would normally be described as mere transients. Thus, apart from short circuit conditions caused accidentally, even the attempt to connect or disconnect a lamp when the power is on results in an immediate cut off of the power supply. While it is possible that installing or removing a lamp may produce sparks, the duration of any such sparks, and hence the amount of energy released with the system of this invention, is insufficient to cause ignition of ambient flammable gas mixtures, etc.

Sensitivity of the lamp current monitoring circuit "E" is regulated in accordance with the ohmic value of the SCR base resistors 90 associated with IC71 of the diverter circuit "I"; the higher the resistance, the greater the sensitivity. Consequently, these resistance values are selected to prevent non-intrinsically safe sparking while avoiding unnecessary response to transient currents caused by normal striking of the fluorescent lamps.

In order to satisfy international standards for intrinsically safe electrical equipment, it is necessary that such circuits remain safe even when there are two separate faults in the circuit, including component failures. Consequently, several components in the herein disclosed circuit have been triplicated such as capacitors 42(ABC), 42(DEF); 82(BCD); resistances 60, 61, 62, IC71(ABC) and IC71(DEF).

In considering the lamp control circuit "D", it is to be noted that at zero length of the lamp supply cable, the natural resonant frequency of the control circuit "D" is considerably higher than that of the oscillator "G" which controls the inverter "C". As the length of cable between the lamp control circuit "D" and the lamp increases, the cable losses which occur are compensated for by an increase in output voltage from control circuit "D"; the increased cable capacitance reducing the natural resonant frequency of control circuit "D" so that it approaches the oscillator frequency, thus increasing the lamp circuit voltage and current. In usage with lamp cable lengths of one hundred feet or more, the resonant frequency of the lamp, cable and control circuit can correspond to the oscillator frequency. In that event, the inverter is switched "off" by conduction of one or more of the SCRs. In practice therefore, lamp cable lengths are limited to approximately seventy-five feet which is adequate for most installation applications.

From the foregoing, it is believed that those skilled in this art will readily recognize the improved advancement presented by the disclosed invention and it will be readily apparent that the described illustrative embodiment thereof may be modified and equivalents substituted therein without departing from the present invention which is intended to be unlimited by the foregoing except as may appear to the hereinafter appended claims.

The embodiments of the invention in which an exclusive property or privilege is claimed are defined as follows:

1. In a lighting system for operating fluorescent lamps with high frequency power in a potentially explosive atmosphere, an intrinsically safe control system individually associated with each lamp, comprising: DC to AC inverter means productive of high frequency output; lamp control circuit means powered by the output of said inverter means; current monitoring means in circuit with said lamp control circuit means and the associated lamp and operable to detect abnormally high current in the lamp circuit; said monitoring means comprising impedance components in series with said lamp control circuit means and said lamp; each impedance component being in parallel with series related zener and light emitting diodes such that any abnormally high or transient current in the lamp circuit causes one or more light emitting diodes to emit light; and diverter means activated by such diode emitted light to effect deactivation of said inverter means thereby to cut off the lamp's power supply; said deactivation being sufficiently rapid as to avoid incendive sparking in the circuit.

2. The control system of claim 1, wherein said inverter means comprises field effect transistors, gate control circuit means controlling operation of said transistors, oscillator means driving said gate control circuit means, and electronically controlled relay means operably responsive to activation of said diverter means to deactivate said oscillator means and gate control circuit means.

3. The control system of claim 2, and time delay means operable to operate said relay means and reestablish power supply to the lamp after a predetermined time interval; such operation being limited to a time period insufficient to produce ignition of the explosive atmosphere if the abnormally high or transient current is still present.

4. An intriniscally safe control system for operating individual fluorescent lamps with high frequency power in a potentially explosive atmosphere, comprising:

DC to AC inverter means productive of high frequency output and comprising field effect transistors;
  gate control circuit means controlling operation of said transistors,
  oscillator means for driving said gate control circuit means;
  lamp control circuit means inductively coupled to said inverter means and comprising lamp operating ballast, resonant and heater circuits for operating the lamp;
  current monitoring means directly coupled to and between said lamp control circuit means and the lamp and comprising impedance components in parallel with back-to-back zener diodes which are in series with light emitting diodes and so arranged that any transient or any abnormally high current in the lamp circuit causes one or more of said light emitting diodes to emit light;
  current diverter means comprising one or more SCR's optically coupled to said light emitting diodes and operable when energized to effectively ground said oscillator means and gate control circuit means to deactivate said inverter means before incending sparking occurs, and electronically controlled over current trip reset relay means including time delay capacitor means in circuit therewith; said relay means being operated by activation of said SCR's to deenergize said diverter means, said SCR's, said oscillator means and said gate control circuit means whenever an abnormally high or transient current is detected by said monitoring means; said capacitor means serving to effect operation of said relay means and reenergization of said inverter means after a predetermined time delay thereby to reenergize the lamp circuit for normal operation provided said high or transient current is abated.

5. The combination of claim 4, wherein said resonant circuit comprises an inductor and a plurality of capacitors in circuit with a multi-conductor lamp supply cable whereby a short in the cable effects discharge of one or more capacitors to produce transient currents operable to trigger operating activity of said monitoring means.

* * * * *